W. R. FRIEDEL.

MOLDING.

APPLICATION FILED MAR. 31, 1915.

Reissued May 4, 1915.

13,910.

INVENTOR:

Wm. R. Friedel,

BY Chamberlin & Hendricks

ATTORNEYS.

UNITED STATES PATENT OFFICE.

WILLIAM R. FRIEDEL, OF MEMPHIS, TENNESSEE.

MOLDING.

13,910. Specification of Reissued Letters Patent. Reissued May 4, 1915.

Original No. 1,113,896, dated October 13, 1914, Serial No. 818,680. Application for reissue filed March 31, 1915. Serial No. 18,424.

*To all whom it may concern:*

Be it known that I, WILLIAM R. FRIEDEL, a citizen of the United States, and a resident of Memphis, county of Shelby, and State of Tennessee, have invented an Improved Wall-Covering and Molding, of which the following is a specification.

When a wall is covered with what is known as wall board by one not having made a thorough study of this particular art, even though he be a skilled carpenter, it usually happens that no provision is made for expansion and contraction and in due time the wall board expands and buckles.

The main object of the present invention is to produce a wall covering including wall boards and molding strips so shaped that the boards will be firmly clamped in place but cannot be held in such a way as to interfere with the free and natural expansion and contraction thereof.

In carrying out my invention the molding may be made in slightly different ways to accommodate different places in a building as, for instance, the ordinary side wall or ceiling and the corner. In forming the molding a rabbet is provided merging into a suitable groove which receives a clamping member for engaging a board having an edge lying in the rabbet. The important feature is that the front or outer bounding wall of each groove, in the principal forms, is continued beyond the groove out over the adjacent rabbet so as to provide a flange overhanging the rabbet. The result is that the carpenter, in cutting his wall board after the molding strips have been placed in position, measures between the near edges of the flanges on adjacent strips and cuts the wall board to a width approximately equal to this distance. Then, when the wall board is placed in position, it does not completely fill either of the rabbets in the two molding strips between which it lies, and consequently ample room is left for expansion of the wall board or panel. By properly proportioning the parts it even becomes impossible for the workman to place in position a wall board cut to such a width that it will completely fill the rabbets, because the overhanging flanges will interfere with the insertion of the edges of the board into the rabbets. The clamping members may be arranged to only clamp the board in place, or may be arranged to act as trimming members provided with overhanging hooks for clamping an extra strip of board in place centrally of the molding, whereby a trimming effect is produced.

Figure 1:
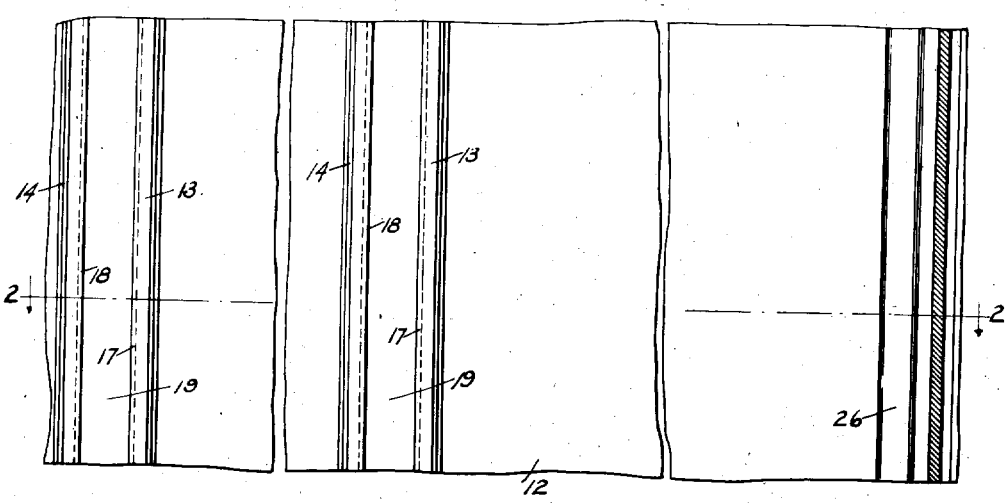
Figure 1:
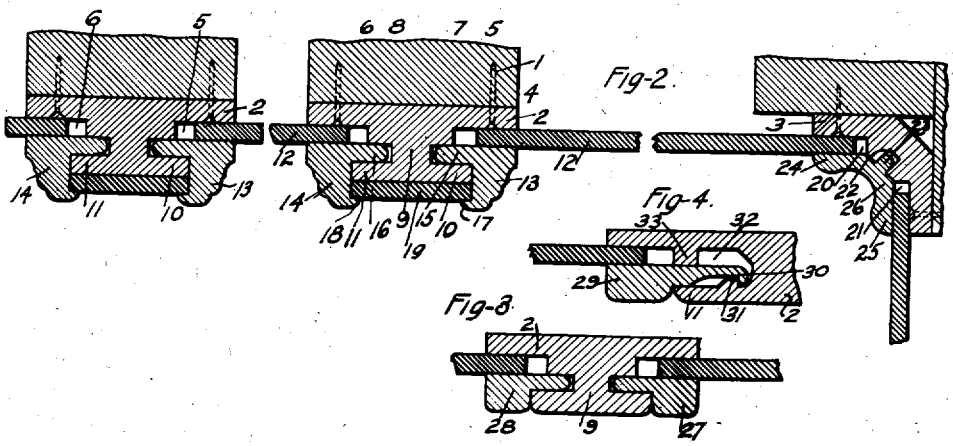

In the accompanying drawings—Figure 1 is an elevation of part of a wall disclosing an embodiment of the invention; Fig. 2 is a section through Fig. 1 approximately on line 2—2; Fig. 3 is a sectional view through a slightly modified form of molding; and Fig. 4 is a fragmentary view similar to Fig. 3, but disclosing a slightly modified form of the invention.

Referring to the accompanying drawings by numeral, 1 indicates a suitable studding which is part of any desired kind of wall and 2 and 3 the moldings. The molding 2 is secured to the support 1 by any suitable means, as for instance nails, 4. In forming the molding 2 it will be observed that a pair of rabbets, 5 and 6, are provided which merge into grooves, 7 and 8. By providing these rabbets on opposite sides of the molding 2 a central body, 9, is presented having overhanging flanges, 10 and 11, which overhanging flanges overlap part of the rabbets 5 and 6. Rabbets 5 and 6 are designed to accommodate boards or panels, 12, which may be what is known as wall board. In order to hold the boards 12 in place retaining strips, 13 and 14, are provided which are formed with flanges, 15 and 16, respectively, for fitting into the grooves 7 and 8. The strips 13 and 14 are provided with overhanging portions, 17 and 18, whereby channels are presented which accommodate the flanges 10 and 11, and also the edges of a strip of wall board, 19.

In connection with the molding 3 it will be observed that the same is formed for a corner, and that notches, 20 and 21, are provided, together with a groove, 22, in which a bead, 23, is fitted so that the flanges, 24 and 25, of clamping member 26 may press against the wall board 12 for clamping the same tightly in notches 20 and 21. The member 26 may be held in place by suitable nails or other securing means. In both the corner construction and the molding 2 ample space is provided in the rabbets 5 and 6, and notches, 20 and 21, for permitting a free expansion of the various parts.

In practice the molding strips are first fastened in place and then the workman cuts the panels 12 to the proper widths to fit between the strips. In measuring between two of the strips, 2, the workman will naturally measure between the edge of the flange 10 on one strip and the near edge of the flange 11 on the other strip and so will cut the wall board narrower than the seat bounded at two sides by the rabbets. In other words, there will be a clearance between each edge of the panel and inner edge of the corresponding rabbet equal to the amount of overhang of the flanges 10 and 11. Furthermore, if the workman cuts the panel materially wider than the distance between a flange 10 and a flange 11 he will find it impossible, with the parts proportioned as shown, to slip the panel in place and will therefore be required to make the panel narrower. In any event, each flange always forms a natural measuring point so that if there be a molding strip, 2, on one side only, the natural tendency of the workman will be always to cut the panel narrower than the space which it is to occupy in the wall and thus allow for free expansion.

In Fig. 3 a slightly modified form of the invention is disclosed wherein strips, 27 and 28, are provided which are similar to strips 13 and 14 except that the overhanging portions 17 and 18 are eliminated, and the strips merely provided with heads so as to properly flush with the surface of body 9. It will also be noted that the inner ends of members 13 and 14 as well as members 27 and 28 are rounded, and fall short of the bottom of the grooves to which they are fitted so that the strips may be driven up tight on the face side in order to make a good mechanical joint.

In Fig. 4 is seen a slightly further modified form of the invention in which the strip 29 is provided with a hooked end, 30, adapted to hook over the bead 31 formed on member 2. It is to be observed that member 2 is provided with a chamber, 32, so as to easily insert the hooked end 30. In order to cause a proper fit a strip, 33, is provided which co-acts with member 11 and hooked end 30 for properly holding member 29 in place. In inserting member 29 the same snaps into the position shown in Fig. 4 and consequently is held against displacement.

I claim:

1. A molding strip comprising a body provided with a rabbet on each side and a groove merging into said rabbet, said body being also formed with a face portion arranged on one side of said groove and falling short of the edges of the body, and retaining strips co-acting with said rabbets and said groove for holding in place a wall board extending into said rabbets and arranged on the surface of said face, each of said strips having a bead extending into said groove, and an overhanging edge overhanging the board arranged on said face, whereby said strips clamp the board on said face in position, and the boards having their edges in said rabbets.

2. A wall covering comprising parallel molding strips having rabbets in the sides facing each other, at least one of the strips having on the front a flange portion extending outwardly over the corresponding rabbet in the direction of the opposite strip, a wall board extending at its edges into said rabbets, the width of the board being not greater than the distance from the outer edge of said flange portion to the farthest point on the opposed rabbet in the next strip, and means coöperating with said strips and pressing frictionally on the outer face of the wall board for holding the board in place.

3. A wall covering comprising parallel molding strips having rabbets in the sides facing each other, said strips having flanges lying in front of the rabbets and projecting outwardly partly across the rabbets, a wall board extending at its edges into said rabbets, the width of the wall board being approximately equal to the distance between the nearest points on the flanges of the strips between which the wall board lies, and means coöperating with said flanges and engaging with the outer face of the wall board for holding it in place.

WILLIAM R. FRIEDEL.

Witnesses:
J. P. McGehee,
Marion G. Evans.